United States Patent
Roovers et al.

[11] Patent Number: 5,746,678
[45] Date of Patent: May 5, 1998

[54] CONTINUOUSLY VARIABLE TRANSMISSION

[75] Inventors: Wilhelmus Cornelus Waltherus Maria Roovers, Prinsenbeek; Chi Chung Choi, Eindhoven, both of Netherlands

[73] Assignee: Van Doorne's Transmissie B.V., Tilburg, Netherlands

[21] Appl. No.: 505,153

[22] Filed: Jul. 21, 1995

[30] Foreign Application Priority Data

Aug. 15, 1994 [NL] Netherlands ............. 9401313

[51] Int. Cl.$^6$ ............................ B60K 41/12
[52] U.S. Cl. ................... 477/45; 477/46; 474/18
[58] Field of Search ............. 477/45, 46, 48; 474/28, 18

[56] References Cited

U.S. PATENT DOCUMENTS

| | | | |
|---|---|---|---|
| 4,793,217 | 12/1988 | Morisawa et al. | 477/48 X |
| 4,827,803 | 5/1989 | Miyawaki | 477/46 X |
| 4,872,377 | 10/1989 | Nakamura | 477/46 |
| 4,875,892 | 10/1989 | Sueda | 477/46 X |
| 4,890,516 | 1/1990 | Suzuki | 477/46 |
| 4,948,370 | 8/1990 | Yamada | 477/46 X |
| 4,977,798 | 12/1990 | Takahashi | 477/45 X |
| 5,319,999 | 6/1994 | Morishige et al. | 477/46 |
| 5,382,206 | 1/1995 | Oda et al. | 477/108 |
| 5,439,424 | 8/1995 | Sawada et al. | 477/46 |

FOREIGN PATENT DOCUMENTS

| | | |
|---|---|---|
| 0 217 221 | 4/1987 | European Pat. Off. . |
| 0 239 366 | 9/1987 | European Pat. Off. . |
| 0 602 672 | 6/1994 | European Pat. Off. . |
| 39 02 692 | 8/1989 | Germany . |
| 41 20 540 | 11/1992 | Germany . |

*Primary Examiner*—Khoi Q. Ta
*Assistant Examiner*—Peter T. Kwon
*Attorney, Agent, or Firm*—Young & Thompson

[57] ABSTRACT

A continuously variable transmission, in particular for a motor vehicle, provided with a control for the transmission ratio of the transmission, which control in a first operating mode controls the transmission ratio on the basis of one or more input signals and in a second operating mode controls the transmission ratio, for example on the basis of an external signal originating from the driver of the motor vehicle, along one or more control curves of one or more sets of control curves, possibly within rotational speed limits imposed on the input speed of the transmission. One or more control curves and/or one or more rotational speed limits are a function of the input speed of the transmission in such a way that, in accordance with those functions, the input speed of the transmission is not zero for a notional output speed of the transmission of zero. In this way the drive characteristics of the transmission are appreciably improved, coupled with improved efficiency and optimum power.

13 Claims, 3 Drawing Sheets

CONTINUOUSLY VARIABLE TRANSMISSION

FIELD OF THE INVENTION

The invention relates to a continuously variable transmission, in particular for a motor vehicle, provided with a control for the transmission ratio of the transmission, which control in a first operating mode controls said transmission ratio on the basis of one or more input signals and in a second operating mode controls the transmission ratio, for example on the basis of an external signal originating from the driver of the motor vehicle, along one or more control curves of one or more sets of control curves possibly within rotational speed limits imposed on the input speed of the transmission.

BACKGROUND OF THE INVENTION

A continuously variable transmission of this type is disclosed in German Patent 4 120 540. In addition to a first operating mode in which the transmission itself controls the transmission ratio of the transmission, within a range of possible transmission ratios, a second operating mode is provided which enables the driver of the motor vehicle to select the desired transmission ratio from a number of fixed transmission ratios, which selected transmission ratio is then kept constant by the transmission by means of control along a control curve which has said fixed transmission ratio. Thus, a stepped-ratio transmission, for example a five-speed transmission, can be simulated. Only in the region of the lower and the upper rotational speed limits can the transmission control intervene independently and change to the next adjacent fixed transmission ratio in order to prevent stalling or over-revving of the engine.

The known transmission in itself functions as it should, but nevertheless does have a number of drawbacks. In the second operating mode, the transmission produces an appreciable change in rotational speeds on changing gear, which is found to be undesirable, partly in view of the loss in efficiency and the delay in changing gear. Moreover, especially in the region of the upper rotational speed limit, it is not possible to profit to the optimum extent from the available power. In the region of the lower rotational speed limit, the transmission can be driven only above a rotational speed suitable for driving off, as a result of which it is not possible to make optimum use of lower input rotational speeds with lower fuel consumption when changing down.

SUMMARY OF THE INVENTION

The aim of the present invention is to overcome said drawbacks and to provide an improved transmission. To this end, the transmission according to the invention is characterised in that one or more control curves and/or one or more rotational speed limits are a function of the input speed of the transmission in such a way that, in accordance with said functions, the input speed of the transmission is not zero for a notional output speed of the transmission of zero. In the second operating mode, the transmission, on changing gear, produces a limited change in the rotational speeds and a short change path, as a result of which the driver finds the drive characteristics pleasanter and the efficiency increases. Moreover, optimum use can be made of the available power in the region of the upper rotational speed limit. In the region of the lower rotational speed limit, the transmission according to the invention changes down automatically and, during this operation, makes optimum use of the low input rotational speeds without thereby making it more difficult for the vehicle to be driven off, whilst fuel consumption is optimised.

According to a further development of the invention, a control curve has one or more tangents with positive angles of inclination. In particular, the control curve is an essentially straight line. This makes it possible to define the control curves as desired whilst, on the other hand, a uniform change in the vehicle speed over a control curve is possible.

According to the invention, the control curves of a set of control curves can converge in the direction of decreasing input speed of the transmission. With this arrangement, a set of control curves can intersect one another. As a result of this, short changes from one control curve to the other control curve are possible, especially in the low rotational speed range, as a result of which the drive characteristics at low rotational speeds improve and the efficiency improves. A further development of the invention is characterised in that control curves of a set intersect one another at a point of intersection at which the input rotational speeds are greater than zero and the output rotational speeds are notionally equal to or less than zero. In this way, short, efficient changes are possible in the region of both the low and the high input speed of the transmission. Preferably, the input rotational speeds before the point of intersection are in the range of the idling speed of a unit driving the transmission. This appreciably promotes the change-down characteristics when braking and the characteristics when driving off. In particular, the control curves of a set can intersect one another at a point of intersection at which the input rotational speeds are equal to zero and the output rotational speeds are less than zero.

According to a further development of the invention, the function of the upper rotational speed limit has one or more tangents with positive angles of inclination. As a result, the drive characteristics, in particular the acceleration in the upper rotational speed range, are improved in such a way that optimum use can be made of the available power.

A further development of the invention is characterised in that the function of the lower rotational speed limit has one or more tangents with a negative angle of inclination. As a result, the transmission can be driven at low rotational speeds, with low fuel consumption, and, on braking, the transmission is forced to change down to another control curve in such a way that the transmission is brought into a suitable ratio for driving off.

BRIEF DESCRIPTION OF THE DRAWINGS

The invention will be explained with reference to drawings. In the drawings.

DETAILED DESCRIPTION OF THE INVENTION

Figure 1:
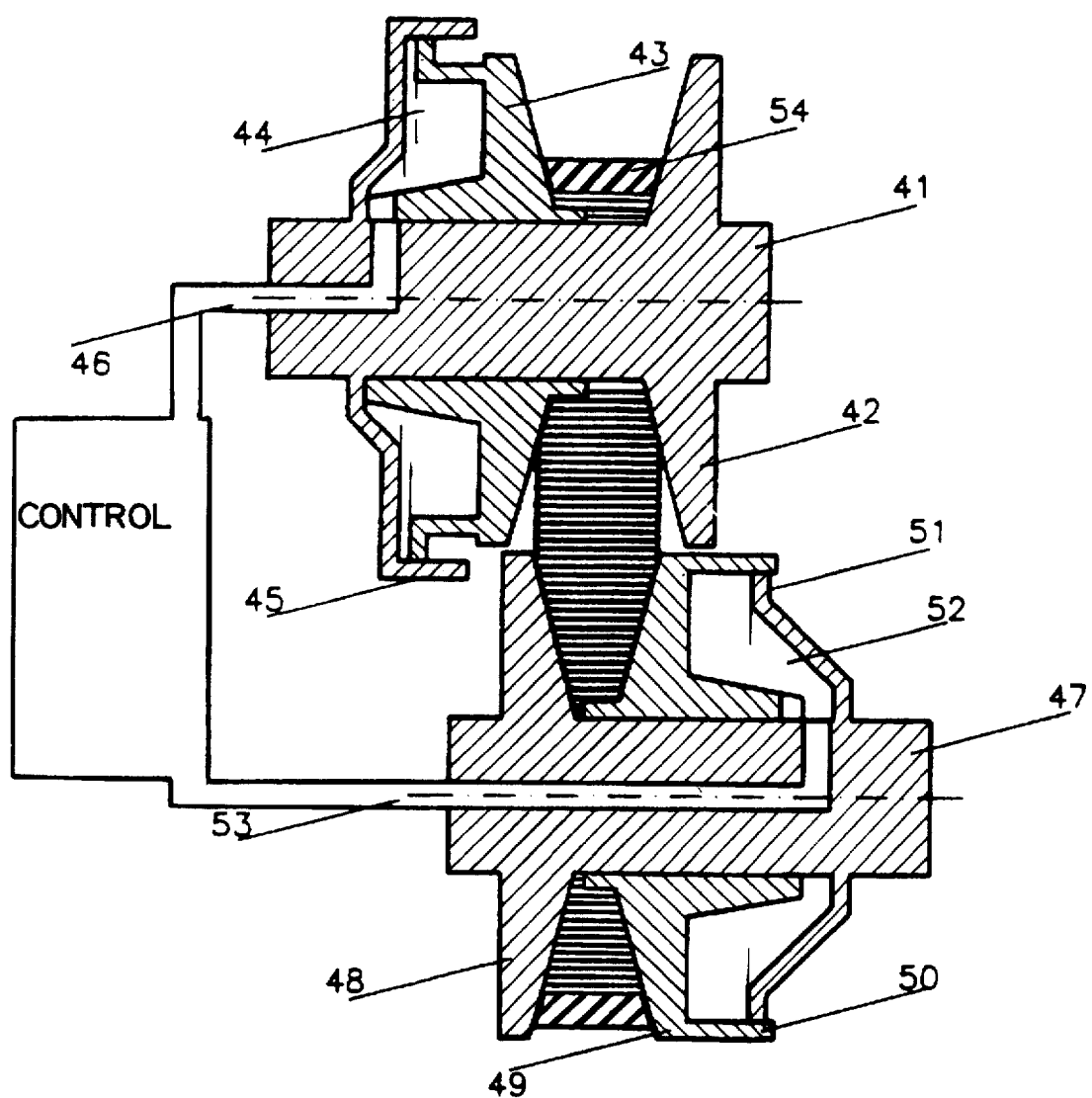
FIG. 1 shows a diagrammatic representation of a continuously variable transmission

The continuously variable transmission shown diagrammatically in FIG. 1 comprises an input shaft 41, which, for example, can be coupled to an engine providing power, as well as an output shaft 47, which, for example, can be connected to the wheels of a vehicle. The input and output shafts 41 and 47 respectively are provided with fixed discs 42 and 48 respectively, as well as axially slidable discs 43 and 49 respectively. The axially slidable discs 43 and 49 are provided with cylinders 45 and 51 respectively, it being possible, via the lines 46 and 53 respectively, to feed fluid into—or out of—the cylinder chambers 44 and 52 respectively, in order to effect axial movement of the discs 43 and 49. A drive medium 54 is located between the disc pairs 42 and 43 on the one side and 48 and 49 on the other side, the ratio of the radial position between the discs 42 and 43 and of the radial position between the discs 48 and 49 being decisive for the transmission ratio of the transmission at a given point in time. The transmission ratio can be changed by means of suitable control of feed and removal of fluid into and out of the cylinder chambers 44 and 52. With this arrangement, the transmission ratio is, in principle, infinitely variable within a certain range.

Figure 2:
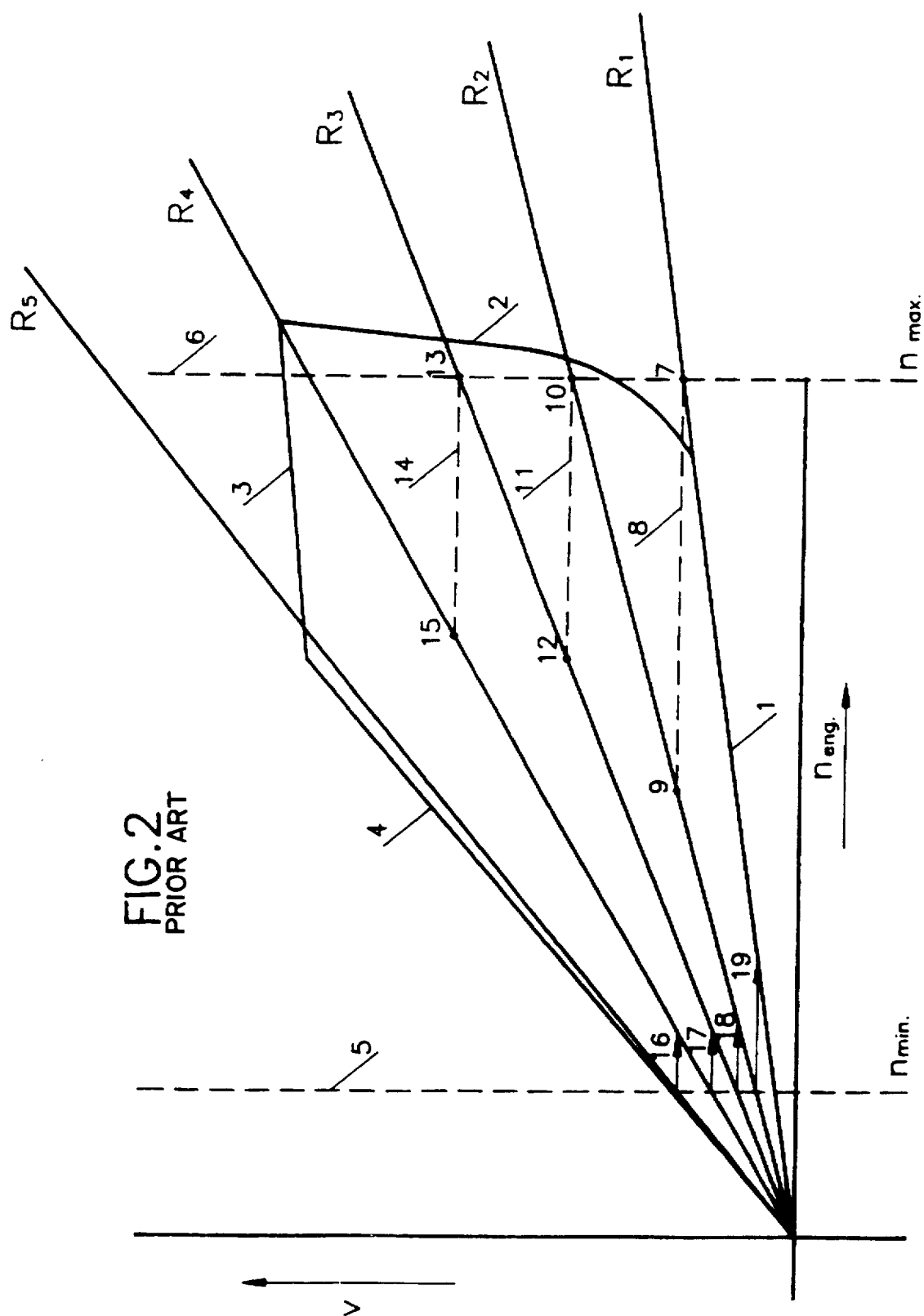
FIG. 2 shows a variogram of a continuously variable transmission according to the prior art

In FIG. 2 this range is shown in a so-called variogram with the input speed $n_{eng}$ of the transmission on the horizontal axis and the vehicle speed V, which is related to the output speed of the transmission, on the vertical axis.

The transmission ratios can be varied within the lines 1, 2, 3 and 4. In the text which follows it is assumed that the further aspects of the functioning of a continuously variable transmission are known. Under certain circumstances, it can be desirable that the transmission ratios are not controlled within the entire range but are controlled along one or more fixed lines. This is described in German Patent DE 4 120 540. With this arrangement, as shown in FIG. 2, several lines ($R_1$–$R_5$) with a constant transmission ratio are fixed, along which lines control at a constant transmission ratio is possible. This is effected in a second operating mode, which mode can, for example, be selected by the driver of a vehicle by selecting the desired transmission line, for example $R_2$, in said second operating mode. In this case, the transmission ratio is held constant along $R_2$ and the input rotational speeds $n_{eng}$ and the vehicle speed V can be controlled in a mutually fixed ratio along said curve. In order to prevent over-revving of the engine, an upper rotational speed limit ($n_{max}$ 6) is often applied. At the other extreme, a lower rotational speed limit ($n_{min}$ 5) is applied in order to enable the vehicle to be driven off under all conditions.

If upon accelerating the vehicle, transmission line $R_1$, for example, is selected, the transmission will automatically change over to transmission line $R_2$ when the point of intersection 7 of transmission line $R_1$ and the upper rotational speed limit $n_{max}$ 6 is reached, despite the set selection of $R_1$. Change-up then proceeds in accordance with the lines 7, 8, 9, 10, 11, 12, 13, 14, 15, etc. In this way over-revving of the engine is prevented, but the driver's desire to accelerate is met. Incidentally, the driver is able, by changing over in good time, for example from $R_1$ to $R_2$, to prevent the transmission reaching the upper rotational speed limit $m_{max}$ 6 and thus to remain in complete control of the acceleration of the vehicle. It will be clear that appreciable differences in engine speed will always arise on changing between the various transmission lines ($R_1$–$R_5$). This is found to be undesirable, partly in view of the loss in efficiency and the delay in changing gear. Moreover, no use can be made of line 2 in the variogram, which line 2 describes the line with maximum engine power, so that the drive unit cannot be operated in an optimum manner.

On deceleration of the vehicle, the transmission will automatically change over from one transmission line to another when the lower rotational speed limit $n_{min}$ is reached, to ensure that it is always possible to drive off from stationary at that speed. Thus, on deceleration of the vehicle along transmission line $R_5$, the transmission will automatically change down from $R_5$ to $R_1$ along the arrows 16, 17, 18, 19 at the point of the lower rotational speed limit $n_{min}$ 5.

However, inter alia because of fuel saving, it can be desirable for it also to be possible to drive at rotational speeds lower than $n_{min}$.

Figure 3:
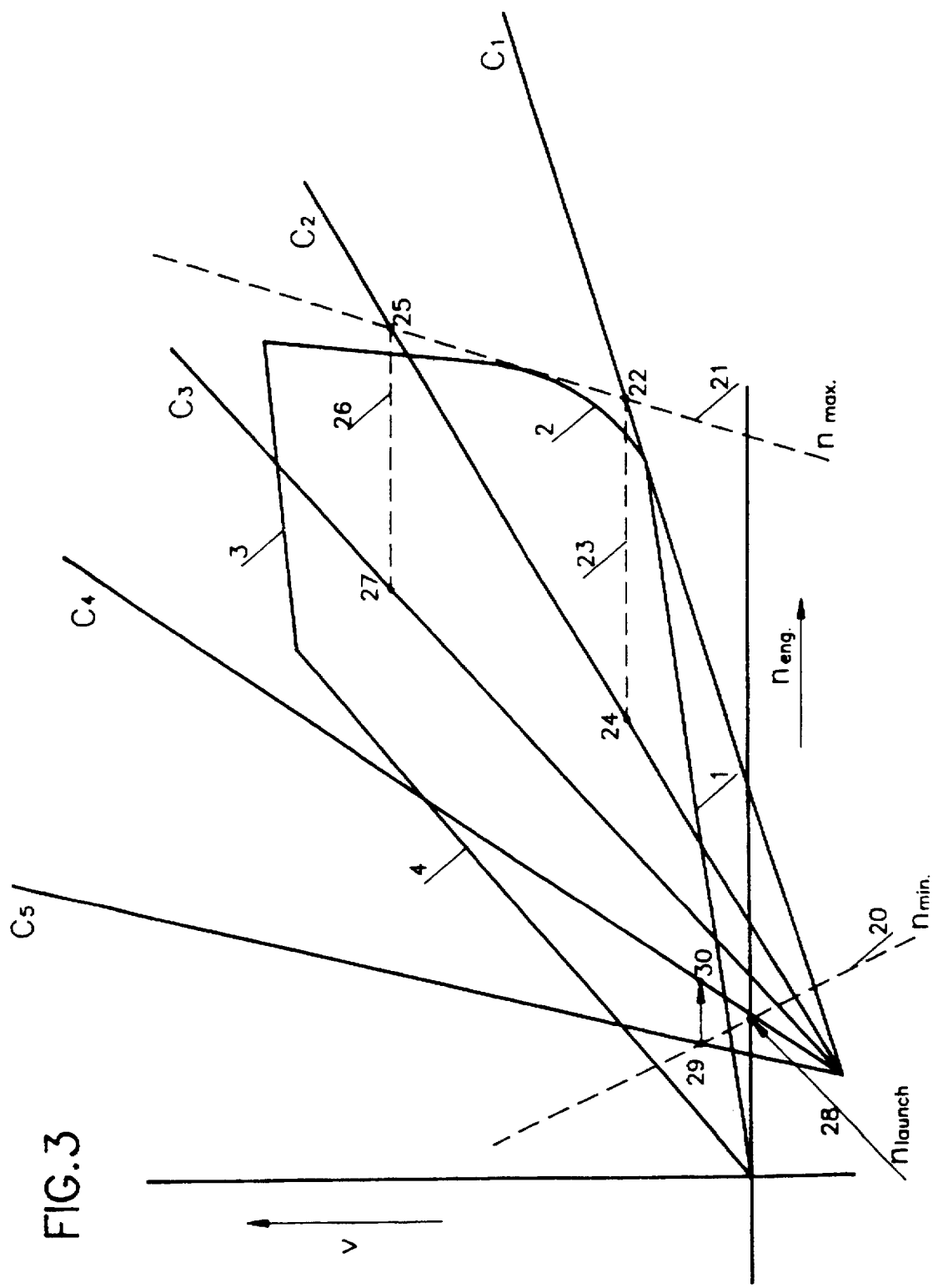
FIG. 3 shows a variogram of a continuously variable transmission according to the invention with control curves and rotational speed limits.

FIG. 3 shows the same variogram 1, 2, 3, 4, but in this case for the present invention. The control curves $C_1$–$C_5$ according to the invention, which can be activated in a second operating mode of the transmission, are plotted in this variogram. The control curves $C_1$–$C_5$ are clearly not lines with a constant transmission ratio, because, unlike the transmission lines $R_1$–$R_5$ according to the prior art, they do not pass through the origin. In contrast, the curves $C_1$–$C_5$ are a function of the input speed $n_{eng}$ of the transmission, in such a way that, according to said function, the input speed $n_{eng}$ of the transmission is not zero for a notional output speed of the transmission of zero. As a result of this measure, on accelerating a vehicle, for example from the control curve $C_1$, changing will proceed, for example, along the path 22, 23, 24, 25, 26, 27. It will be clear that the length of the change path according to the invention is appreciably shorter than that according to the prior art and that the average drop in rotational speeds on changing from the one control curve to the other control curve is also shorter. The gear changing behaviour of the transmission is thus found to be pleasanter and is, moreover, more efficient. Preferably, the driver of the vehicle changes gear within the set maximum rotational speed limit $n_{max}$ 21, but, otherwise, when said limit is reached, the transmission will itself also effect changing in order to obtain the desired vehicle acceleration without over-revving the engine. According to the invention, the upper rotational speed limit $n_{max}$ 21 is also a function of the input speed $n_{eng}$ of the transmission, in such a way that the curve 2 towards the maximum engine power is approached in the best possible manner and optimum use can be made of the available engine power.

In the variogram, $n_{launch}$ 28 shows the rotational speeds which are necessary for driving off. The lower rotational speed limit $n_{min}$ 20 comprises said $n_{launch}$ 28, but according to the invention is also made dependent on the input rotational speeds $n_{eng}$. As a result, it is also possible to drive for some time at rotational speeds lower than $n_{launch}$, which can be advantageous for the fuel consumption, whilst the lower rotational speed limit $n_{min}$ 20 ensures that, on braking the vehicle, change-down proceeds via, for example, the path 29, 30, 28, to the rotational speeds $n_{launch}$ at which it is possible to drive off. In addition to said rotational speed limit, even lower or higher safety limits can optionally be applied, which limits, for example in the event of malfunction, limit the rotational speeds absolutely and, for example, control them along vertical lines.

The control curves $C_1$–$C_5$ and the lower and upper rotational speed limits $n_{min}$ 20 and, respectively, $n_{max}$ 21 are shown here as straight lines, but, depending on the specific application, can also very well assume other shapes, in which context positive angles of inclination are preferably always used for the control curves $C_1$–$C_5$ and the upper rotational speed limit $n_{max}$ 21 in order to achieve a uniform transition along the curves. In this context, the upper rotational speed limit $n_{max}$ 21 can advantageously be located along curve 2 so that optimum use can be made of the available engine power. The lower rotational speed limit $n_{min}$ 20 has, in particular, negative angles of inclination. To provide good coverage of the variogram and optimum driving feel, the control curves $C_1$–$C_5$ converge in the direction of decreasing input rotational speeds to a common point of intersection. Various positions can advantageously be chosen for said point of intersection, depending on the operating conditions. Consideration can also be given to providing several sets of control curves (different points of intersection, angles of inclination, etc.) from which a set of control curves can be selected, as desired.

The invention is not restricted to the embodiments shown. Many other embodiments are also conceivable within the inventive concept. The transmission control can be either mechanical, hydraulic or electrical, or a combination thereof. The driver of the vehicle can select either the first or the second operating mode, and within both operating modes the transmission can be controlled completely automatically. In the second operating mode, the selection of the specific control curve or selection of a specific set of control curves can optionally also be determined by the driver, in which case, as described above, it is possible, on safety grounds, for the transmission control to intervene necessary.

We claim:

1. Continuously variable transmission comprising a control for the transmission ratio of the transmission, which control in a first operating mode controls the transmission ratio on the basis of at least one input signal and in a second operating mode controls the transmission ratio along at least one control curve of at least one set of control curves, wherein said control curves relate an input speed of the transmission to an output speed of the transmission such that, in accordance with said functions, the control curves of a set converge in the direction of decreasing input speed and, if extrapolated beyond an operating range of said transmission, intersect one another at an intersection point outside a common zero origin of the input speed and output speed of the transmission.

2. Continuously variable transmission according to claim 1, wherein the control curves relate the input speed of the transmission to the output speed of the transmission such that a notional output speed of zero, below which an output is not driven, is achieved when the input speed is not zero.

3. Continuously variable transmission according to claim 2, wherein said at least one control curve is an essentially straight line.

4. Continuously variable transmission according to claim 3, wherein the control curves of a set intersect one another at a point of intersection at which the input rotational speeds are greater than zero and the output rotational speeds are notionally less than zero.

5. Continuously variable transmission according to claim 4, characterised in that the input rotational speeds before the point of intersection are in the range of the idling speed of a unit driving the transmission.

6. Continuously variable transmission according to claim 1, wherein a function of the upper rotational speed limit has a tangent with a positive angle of inclination.

7. Continuously variable transmission according to claim 1, wherein a function of the lower rotational speed limit has a tangent with a negative angle of inclination.

8. Continuously variable transmission according to claim 3, wherein the control curves of a set intersect one another at a point of intersection at which the input rotational speeds are equal to zero and the output rotational speeds are less than zero.

9. Continuously variable transmission according to claim 1, wherein an upper and a lower rotational speed limit are imposed on the input speed of the transmission.

10. Continuously variable transmission according to claim 9, wherein said lower limit represents a linear relationship between said input speed and said output speed of said transmission.

11. Continuously variable transmission according to claim 9, wherein said upper limit represents a linear relationship between said input speed and said output speed of said transmission.

12. Continuously variable transmission according to claim 9, wherein said lower limit represents a non-linear relationship between said input speed and said output speed of said transmission.

13. Continuously variable transmission according to claim 9, wherein said upper limit represents a non-linear relationship between said input speed and said output speed of said transmission.

* * * * *